us 007715779B2

United States Patent
Kondo et al.

(10) Patent No.: US 7,715,779 B2
(45) Date of Patent: May 11, 2010

(54) DUPLEX SIMULTANEOUS READING APPARATUS, COPYING APPARATUS, IMAGE PROCESSING APPARATUS AND IMAGE PROCESSING METHOD

(75) Inventors: Shin Kondo, Kanagawa (JP); Katsuya Koyanagi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1021 days.

(21) Appl. No.: 11/401,969

(22) Filed: Apr. 12, 2006

(65) Prior Publication Data

US 2007/0097411 A1     May 3, 2007

(30) Foreign Application Priority Data

Oct. 31, 2005  (JP) .............................. 2005-316906

(51) Int. Cl.
G03G 21/04      (2006.01)
(52) U.S. Cl. ....................... 399/367; 382/100; 382/173; 382/181; 358/2.1; 358/3.13
(58) Field of Classification Search ................ 399/361, 399/363–368, 374; 382/100, 173, 181; 358/2.1–3.22; G03G 21/04

See application file for complete search history.

(56) References Cited

U.S. PATENT DOCUMENTS

| 7,379,700 B2* | 5/2008 | Iwata ......................... 399/367 |
| 2002/0054692 A1* | 5/2002 | Suzuki et al. ............... 382/100 |
| 2003/0179399 A1* | 9/2003 | Matsunoshita ............ 358/1.13 |

FOREIGN PATENT DOCUMENTS

JP    A-2003-280469    10/2003

* cited by examiner

*Primary Examiner*—Daniel J Colilla
*Assistant Examiner*—'Wyn' Q Ha
(74) *Attorney, Agent, or Firm*—Oliff & Berridge, PLC

(57) ABSTRACT

A duplex simultaneous reading apparatus having an image reading unit for simultaneously reading a first surface and a second surface of a document, the duplex simultaneous reading apparatus includes: a detection unit for detecting any specified pattern image from image data read by the image reading unit; and a selection unit for selectively inputting the read image data of the first surface of the document and the read image data of the second surface to the detection unit in block units, wherein the detection unit detects the specified pattern image in the first surface or the second surface of the document, from the block-unit image data inputted by the selection unit.

9 Claims, 8 Drawing Sheets

FIG. 1

FIG. 4A  IMAGE DATA OF FIRST SURFACE
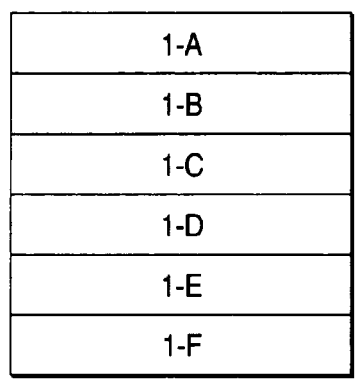
FIG. 4B  IMAGE DATA OF SECOND SURFACE
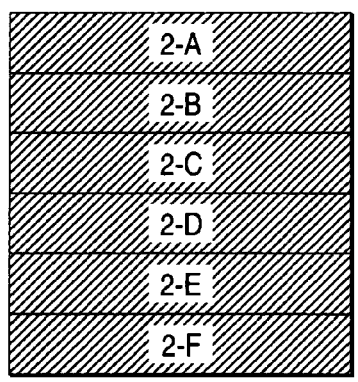
FIG. 4C  OUTPUTS OF BLOCK SELECTION UNIT
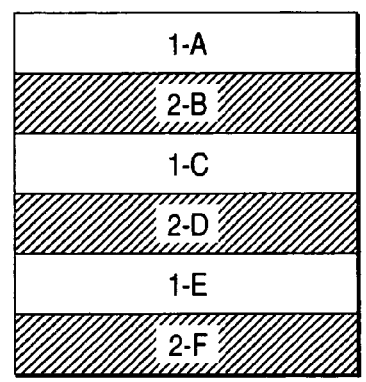

PATTERN IMAGE (A)

PATTERN IMAGE (B)

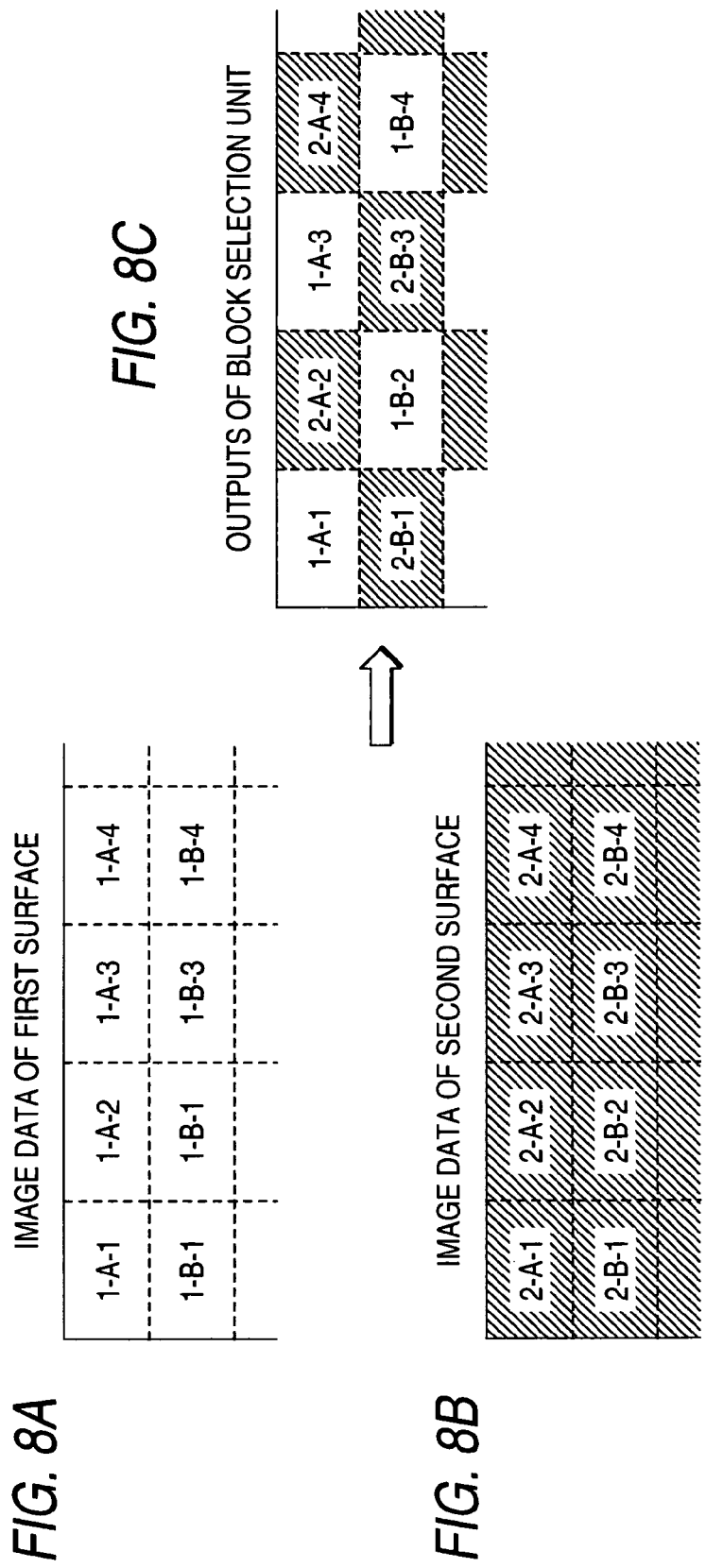

DUPLEX SIMULTANEOUS READING APPARATUS, COPYING APPARATUS, IMAGE PROCESSING APPARATUS AND IMAGE PROCESSING METHOD

BACKGROUND

1. Technical Field

The present invention relates to a duplex simultaneous reading apparatus which is capable of reading a duplex document and which is used for a copying machine, a facsimile, a scanner, etc., and so forth.

2. Related Art

In recent years, with the spreads of personal computers, printers, scanners, copying machines, etc., there has occurred the problem that information items on papers leak out, because even the papers the copying of which is to be prohibited can be easily copied.

In order to prevent the leakage of the information, there has been proposed a technique wherein, when the paper of which the prohibition of copying without permission is required is printed, specified patterns such as copy prohibition information are embedded together with document images such as characters and figures. When the paper in which the copy prohibition information is embedded is read by a copying apparatus such as scanner, the copy prohibition information is detected by a detection unit, and an output is controlled in accordance with the result of the detection.

SUMMARY

According to a first aspect of the invention, there is provided a duplex simultaneous reading apparatus having an image reading unit for simultaneously reading a first surface and a second surface of a document, the duplex simultaneous reading apparatus including: a detection unit for detecting any specified pattern image from image data read by the image reading unit; and a selection unit for selectively inputting the read image data of the first surface of the document and the read image data of the second surface to the detection unit in block units, wherein the detection unit detects the specified pattern image in the first surface or the second surface of the document, from the block-unit image data inputted by the selection unit.

According to a second aspect of the invention, there is provided a copying apparatus including: an image reading unit for simultaneously reading a first surface and a second surface of a document; a copy unit for copying image data of the first surface and the second surface read by the image reading unit; a selection unit for selecting image data from the read image data of the first surface of the document and the read image data of the second surface in block units; and a detection unit for detecting any specified pattern image from the image data selected by the selection unit, and for outputting control information on the basis of a result of the detection, wherein the copy unit suspends or prohibits the copying on the basis of the control information.

According to a third aspect of the invention, there is provided an image processing apparatus including: an image reading unit for simultaneously reading a first surface and a second surface of a document; a storage unit for storing therein image data of the first surface and the second surface read by the image reading unit; a selection unit for selecting image data from the read image data of the first surface of the document and the read image data of the second surface in block units; and a detection unit for detecting any specified pattern image from the image data selected by the selection unit, and for outputting control information on the basis of a result of the detection, wherein the image data stored in the storage unit are erased on the basis of the control information.

According to a fourth aspect of the invention, there is provided a method for processing an image including: simultaneously reading a first surface and a second surface of a document; selecting image data from image data of the first surface and the second surface having been read; detecting any specified pattern image from the selected image data; outputting control information for suspending or prohibiting copying of the document, on the basis of a result of the detection; and suspending or prohibiting the copying of the document on the basis of the control information.

According to the present invention, it is possible to provide a duplex simultaneous reading apparatus in which, when any specified pattern such as copy prohibition information exists, the detection of the specified pattern and a later process based on the detection of the specified pattern can be performed early.

BRIEF DESCRIPTION OF THE DRAWINGS

Embodiments of the present invention will be described in detail based on the following figures, wherein:

FIG. 1 is a view showing an image processing system to which an embodiment of the present invention is applied;

FIGS. 4A to 4C are explanatory diagrams showing the aspect of the selection of image data by a block selection unit;

FIGS. 8A to 8C are explanatory diagrams for explaining another aspect in block selection.

DETAILED DESCRIPTION

Figure 2:
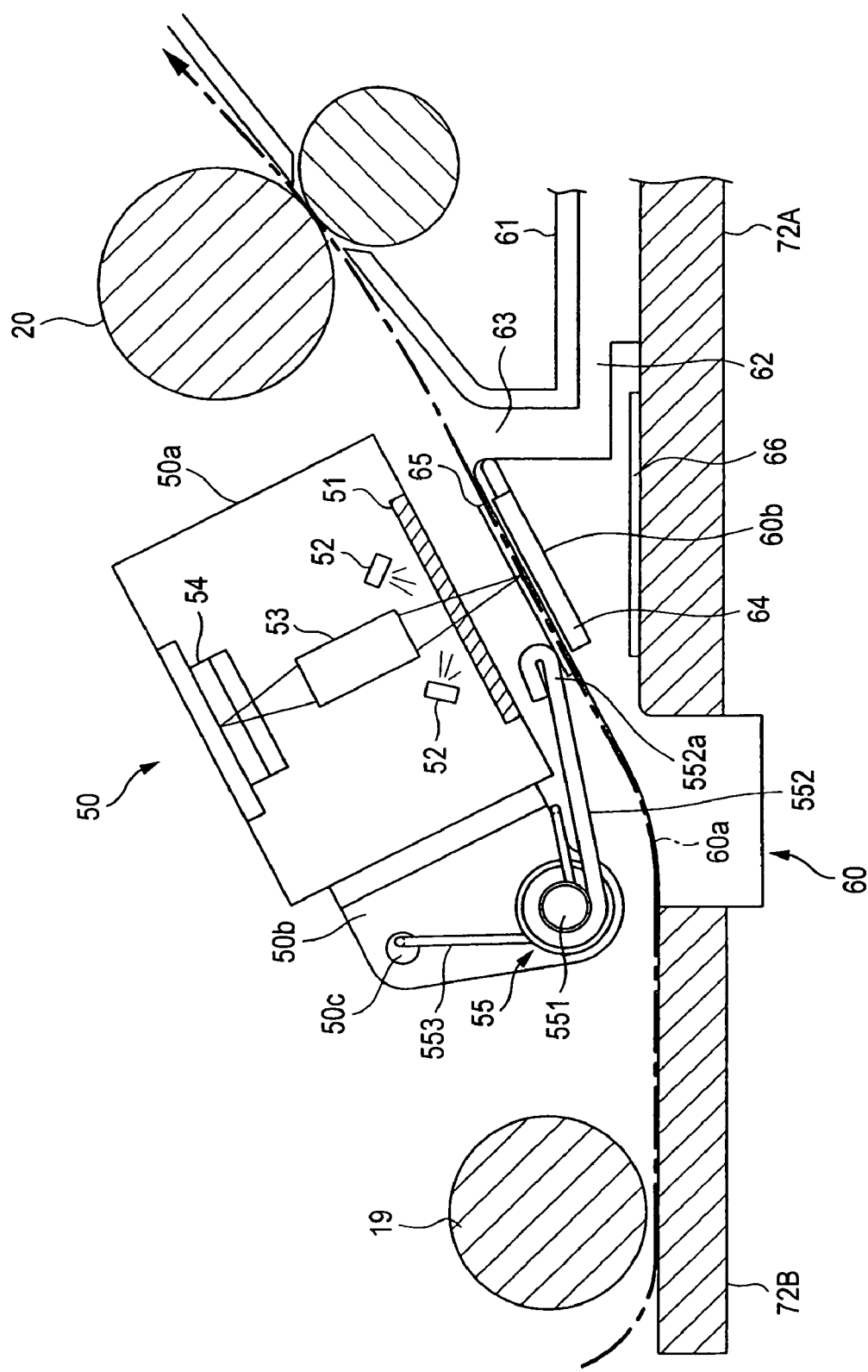
FIG. 2 is a view for explaining a reading structure which employs a CIS.

Now, embodiments of the present invention will be described in detail with reference to the drawings.

First Embodiment

Figure 1:
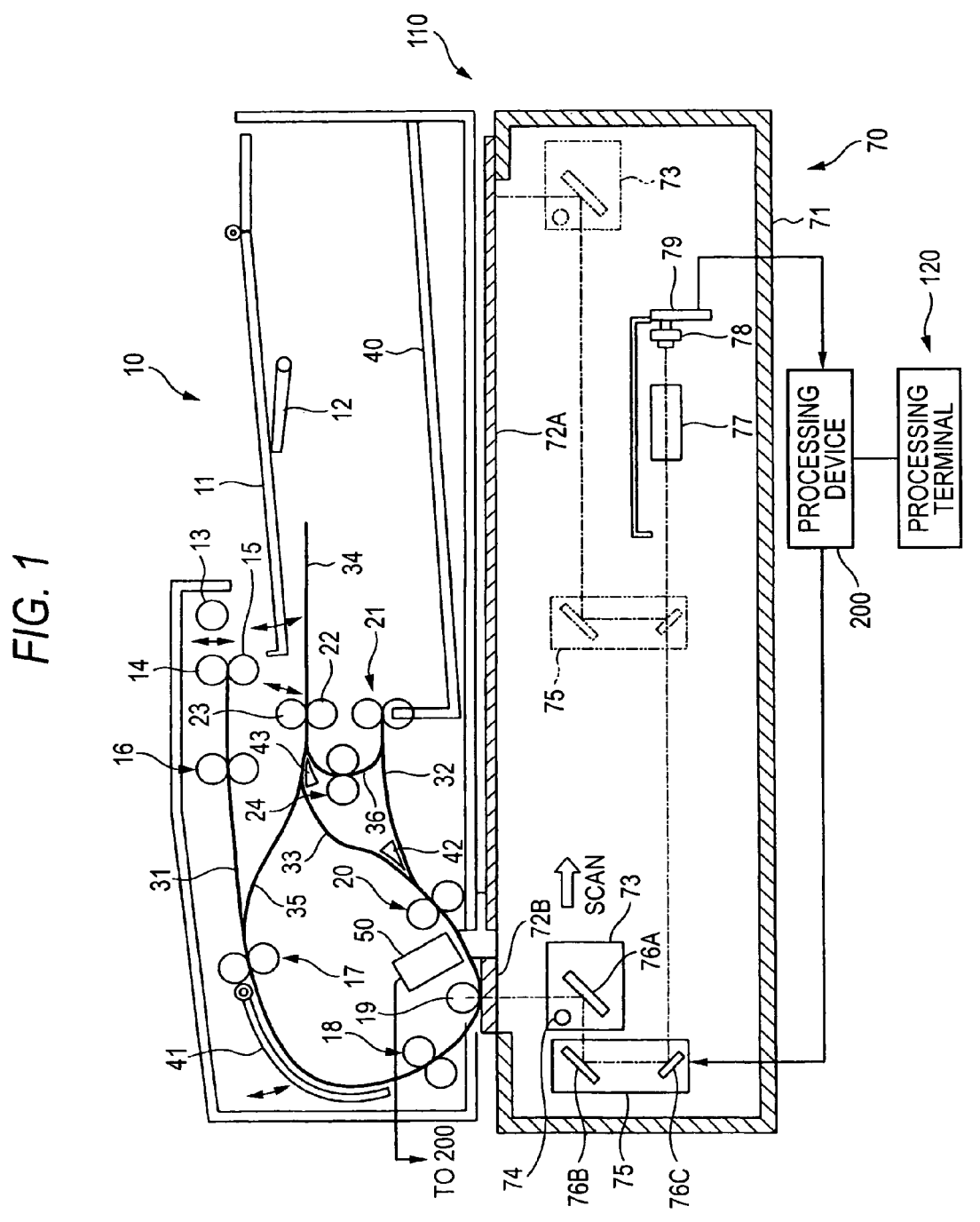

FIG. 1 is a view showing an image processing system to which this embodiment is applied. The system is configured of a duplex simultaneous reading apparatus 110 and a processing terminal 120. The duplex simultaneous reading apparatus 110 is broadly divided into a document feed device 10 which successively conveys documents from a bundle of stacked documents, a scanner device 70 which loads an image by a scanning operation, and a processing device 200 which processes a loaded image signal. Besides, the processing terminal 120 executes a predetermined process, such as copying or storing image data, on the basis of a signal outputted from the processing device 200.

The document feed device 10 includes a document tray 11 on which the document bundle consisting of the plurality of documents is stacked, and a tray lifter 12 which lifts and lowers the document tray 11. Also, the document feed device 10 includes a nudger roll 13 which conveys the documents of the document tray 11 lifted by the tray lifter 12, a feed roll 14 which conveys the document conveyed by the nudger roll 13, downstream still further, and a retard roll 15 which separates the documents supplied by the nudger roll 13, one by one. A first conveyance path 31 along which the document is first conveyed, includes takeaway rolls 16 which convey the separated document to rolls located downstream, and the preregistration rolls 17 which convey the document to rolls located downstream still further and which form a loop. Further, the first conveyance path 31 includes the registration rolls 18 which restart rotations in well-timed fashion after having stopped once, so as to supply the document while making registration adjustments for a document reading portion. Besides, the first conveyance path 31 includes a platen roll 19 which assists the conveyance of the document being loaded, and out rolls 20 which convey the loaded document downstream still further.

In addition, the first conveyance path 31 includes a baffle 41 which turns about a fulcrum in accordance with the loop state of the conveyed document. Further, a CIS (Contact Image Sensor) 50 (second reading portion) being an image reading unit is interposed between the platen roll 19 and the out rolls 20. A second conveyance path 32 and a third conveyance path 33 are disposed downstream of the out rolls 20, and a conveyance path changeover gate 42 for changing-over these conveyance paths is disposed. Also disposed are an ejection tray 40 on which the documents having been loaded are stacked, and first ejection rolls 21 which eject the document onto the ejection tray 40.

Besides, a fourth conveyance path 34 which switches back the document having passed along the third conveyance path 33 is disposed. Further included are an inverter roll 22 and an inverter pinch roll 23 which are disposed in the fourth conveyance path 34, and which actually switch back the document. Also provided is a fifth conveyance path 35 by which the document switched back by the fourth conveyance path 34 is guided again to the first conveyance path 31 including the preregistration rolls 17, etc. Further provided is a sixth conveyance path 36 which ejects the document switched back by the fourth conveyance path 34, onto the ejection tray 40. Also included are second ejection rolls 24 which are disposed in the sixth conveyance path 36 and which convey the document to-be-inverted-and-ejected, to the first ejection rolls 21, and an outlet changeover gate 43 which changes-over the conveyance routes of the fifth conveyance path 35 and the sixth conveyance path 36.

In a standby mode, the nudger roll 13 is lifted up to be held at a retreat position, whereas in a document conveyance mode, it descends to a nip position (document conveyance position) and conveys the uppermost document on the document tray 11.

The nudger roll 13 and the feed roll 14 convey the document by the coupling of a feed clutch (not shown). The preregistration rolls 17 form the loop with the front end of the document abutting on the registration rolls 18 which are at a stop. In the registration rolls 18, that front end of the document which has been bitten by the registration rolls 18 is returned to the nip position in forming the loop. When the loop has been formed, the baffle 41 is opened about the fulcrum, and it functions so as not to hamper the loop of the document. Besides, the takeaway rolls 16 and the preregistration rolls 17 hold the loop which is being loaded. Owing to the loop formation, a load timing can be adjusted, and a skew attendant upon the document conveyance during the load is suppressed, whereby the adjusting function of positioning can be enhanced.

The registration rolls 18 having been stopped start rotating in synchronism with a load start timing, and the document is pressed against a second platen glass plate 72B (to be stated later) by the platen roll 19, so as to load image data from the lower surface of this document. When the reading of a simplex document has ended, or when the duplex simultaneous reading of a duplex document has ended, the conveyance path changeover gate 42 is changed-over so as to guide the document having passed through the out rolls 20, to the second conveyance path 32 and to eject this document onto the ejection tray 40. On the other hand, when the duplex document is sequentially read, the conveyance path changeover gate 42 is changed-over so as to guide the document to the third conveyance path 33 for the purpose of inverting the document. When the duplex document is sequentially read, the inverter pinch roll 23 is retracted and has its nip released in a state where the feed clutch (not shown) is OFF, thereby to guide the document to the inverter path (fourth conveyance path 34). Thereafter, the inverter pinch roll 23 is nipped, whereby the document to be inverted is guided to the preregistration rolls 17 by the inverter roll 22, or the document to be inverted and ejected is conveyed to the second ejection rolls, 24 of the sixth conveyance path 36.

The scanner device 70 can include the document feed device 10 described above, and it supports the document feed device 10 by a device frame 71 and reads the image of the document conveyed by this document feed device 10. The scanner device 70 is such that the device frame 71 forming a first housing is provided with a first platen glass plate 72A on which the document to have its image loaded is placed in a stationary state, and the second platen glass plate 72B which forms an opening for light for reading the document that is being conveyed by the document feed device 10.

By the way, in this embodiment, the document feed device 10 is mounted on the scanner device 70 so as to be swingable with a fulcrum at its backside. In setting a document on the first platen glass plate 72A, the document feed device 10 is raised, and the document is placed, whereupon the document feed device 10 is lowered and pushed onto the side of the scanner device 70. Besides, the scanner device 70 being a first reading portion includes a full-rate carriage 73 which is stationary under the second platen glass plate 72B, and which loads an image by a scanning operation over the entirety of the first platen glass plate 72A. Also, the scanner device 70 includes a half-rate carriage 75 which offers light obtained from the full-rate carriage 73, to an image coupling portion.

The full-rate carriage 73 includes an illuminating lamp 74 which is a projection unit or a light source for projecting the light onto the document, and a first mirror 76A which receives reflected light obtained from the document. Further, the half-rate carriage 75 includes a second mirror 76B and a third mirror 76C which offer light obtained from the first mirror 76A, to a focusing portion. Still further, the scanner device 70 includes a focusing lens 77 which optically reduces an optical image obtained from the third mirror 76C, and a CCD (Charge Coupled Device) image sensor 78 (first reading portion) being a read unit or a sensor which photoelectrically converts an optical image focused by the focusing lens 77. Besides, a drive substrate 79 on which the CCD image sensor 78 is mounted is included, an analog image signal obtained by the CCD image sensor 78 is converted into a digital image signal on the drive substrate 79, and the digital image signal is sent to the processing device 200.

Here, first of all, in a case where the image of the document placed on the first platen glass plate 72A is to be read, the full-rate carriage 73 and the half-rate carriage 75 move in a scan direction (the direction of an arrow) at a ratio of 2:1. On this occasion, the light of the illuminating lamp 74 of the full-rate carriage 73 is projected onto the surface to-be-read of the document, and reflected light from the document is reflected by the first mirror 76A, second mirror 76B and third mirror 76C in succession and is guided to the focusing lens 77. The light guided to the focusing lens 77 is focused on the photosensitive face of the CCD image sensor 78. The CCD image sensor 78 is a unidimensional sensor, which processes one line at the same time. When one line in a line direction (the main scan-direction of the scanning operation) has been read, the full-rate carriage 73 moves in a direction (subscan direction) orthogonal to the main scan direction, so as to read the next line of the document. Such steps are executed over the whole size of the document, whereby the document reading of one page is completed.

On the other hand, the second platen glass plate 72B is constructed of a transparent glass plate which forms, for example, an elongate plate-like structure. The document conveyed by the document feed device 10 passes on the second platen glass 72B. On this occasion, the full-rate carriage 73 and the half-rate carriage 75 are in states where they stop at positions of solid lines indicated in FIG. 1. First, reflected light from the first line of the document passing through the platen roll 19 of the document feed device 10 is focused by the focusing lens 77 via the first mirror 76A, second mirror 76B and third mirror 76C, and a resulting image is read by the CCD image sensor 78. More specifically, one line in the main scan direction is processed at the same time by the CCD image sensor 78 being the unidimensional sensor, and the next line in the main scan direction, of the document conveyed by the document feed device 10 is thereafter read. After the front end of the document has arrived at the reading position of the second platen glass plate 72B, the document passes through the reading position of the second platen glass plate 72B, whereby the reading of one page is completed over the subscan direction.

In this embodiment, when the first surface of the document is read by the CCD image sensor 78, the second surface of the document is simultaneously read by the CIS 50. In this way, both the surfaces of the document can be read by one time of conveyance without conveying the document repeatedly. Here, the expression "simultaneously" does not signify the perfect coincidence of time, but it signifies the identical conveyance operation of the document. Incidentally, although this embodiment exemplifies the aspect in which the image data of the first surface and second surface are read by moving the document, the image data can also be read by moving the image reading unit or by moving both the document and the image reading unit. Besides, in this embodiment, the document surface read by the CCD image sensor 78 has been explained as the first surface, and the document surface read by the CIS 50 as the second surface, but the document surface read by the CCD image sensor 78 can also be grasped as the second surface, and the document surface read by the CIS 50 as the first surface.

FIG. 2 is a view for explaining a reading structure which employs the CIS 50.

As shown in FIG. 2, the CIS 50 is disposed between the platen roll 19 and the out rolls 20. The first surface of a document is pushed against the second platen glass plate 72B, and the image of the first surface is read by the CCD image sensor 78. On the other hand, the image of the second surface is read by the CIS 50 from the other side which opposes through the conveyance path for conveying the document.

The CIS 50 includes a housing 50a, a glass plate 51 which is set on an opening formed on the conveyance path side of the housing 50a, and LEDs (Light Emitting Diodes) 52 which project light rays onto the second surface of the document through the glass plate 51. Besides, the CIS 50 includes a SELFOC lens (registered trademark) 53 which condenses reflected light rays from the LEDs 52. An analog image data signal, which has been obtained in such a way that light condensed by the SELFOC lens 53 is read by a line sensor 54, is converted into a digital image signal. The digital image signal is sent to the processing device 200 (refer to FIG. 1).

A CCD or CMOS sensor, a contact type sensor, or the like can be employed as the line sensor 54, and it is capable of reading an image of actual dimensions (for example, A4-size having a length of 297 mm). In the CIS 50, the image is picked up using the SELFOC lens 53 and the line sensor 54 without employing any reducing optical system. Therefore, the structure can be simplified, together with reduction in the size of the framework thereof, and consumption power can be lowered. By the way, in case of reading a color image, it is allowed to combine LED light sources in the three colors of R (red), G (green) and B (blue), as the LEDs 52, or to employ a white LED light source, and to employ one set of sensors in three rows for the three colors R, G and B, as the line sensor 54. Besides, in the case of reading the image by the CIS 50, a conveyance path constituting a reading portion is provided with a control member 55 which extends from a protrusion 50b protruding onto an upstream side in the conveyance direction of the document with respect to the housing 50a of the CIS 50, toward a downstream side in the conveyance direction of the document. Also provided is an abutment member 60 being an opposing member against which the document being conveyed abuts.

Here, the control member 55 is attached to the document feed device 10 (refer to FIG. 1) through the CIS 50, but the abutment member 60 is attached to the scanner device 70 (refer to FIG. 1). Besides, a guide 61 is disposed downstream of the abutment member 60, and an opening 63 is provided between the guide 61 and the abutment member 60. Further, a trash pit 62 which collects dust and stains having adhered on the surface of the document is provided in a place which underlies the guide 61 and which is continuous to the opening 63. The control member 55 and the abutment member 60 are disposed in correspondence with the position of the conveyance path so as to extend from the front surface to the rear surface of the document feed device 10, in a direction orthogonal to the conveyance path of the document (that is, in a direction from the front surface to the rear surface of the document feed device).

Besides, the control member 55 includes a rotary shaft 551 which is made of a screw mounted on the above protrusion 50b, and a guide member 552 being a flat guide member, which is swingably supported by having one end thereof wound round the rotary shaft 551, and the free end or the other end of which extends toward the abutment member 60. Further, the control member 55 includes a torsion spring 553 which is wound round the rotary shaft 551, one arm of which has its end part inserted into a perforation 50c formed in the protrusion 50b, and the other arm of which has its end part arranged so as to urge the guide member 552 into the direction of the abutment member 60. Here, such protrusions 50b are disposed in the two places of both end parts in the direction orthogonal to the conveyance path of the document, and such rotary shafts 551 and torsion springs 553 are also disposed in the two places of both the end parts in correspondence with the protrusions. In contrast, the guide member 552 is extended from the front surface to the rear surface in the direction orthogonal to the conveyance path of the document. In this embodiment, the guide member 552 is constructed of a metallic plate (metal plate) of, for example, SUS. Besides, the free end side of the guide member 552 spreads into the vicinity of the reading position of the CIS 50, concretely, to a position which lies 3 mm upstream of the reading position in the conveyance direction of the document.

Further, a bent portion 552a subjected to hemming is provided on the free end side of the guide member 552, that is, the part thereof as comes into touch with the document. Owing to the provision of the bent portion 552a, paper powder, etc. can be prevented from appearing when the guide member 552 touches the document being conveyed. Besides, the guide member 552 is constructed of the metallic plate and is made flexible by the torsion spring 553, whereby the thickness component of the document being conveyed can be absorbed, and even a document liable to bend can be stably conveyed. On the other hand, the abutment member 60 includes a document conveyance surface 60a which is provided upstream in the conveyance direction of the document and which guides the document being conveyed, and a stepped surface 60b which is formed downstream of the document conveyance surface 60a in the conveyance direction of the document and at a lower stage with respect to the document conveyance surface 60a. Besides, the stepped surface 60b is formed so as to oppose to the extension line of the focus point of light based on the SELFOC lens 53, and a white reference tape 64 which is made of a biaxially extended polyester film is stuck on the stepped surface 60b. Accordingly, the white reference tape 64 is mounted on the scanner device 70 through the abutment member 60.

In this embodiment, the white reference tape 64 is arranged with its upper surface exposed to the conveyance path, and the upper surface of the white reference tape 64 lies on a slightly deeper side (a side coming away from the conveyance path) than the upper surface of the document conveyance surface 60a. Besides, ribs 65 being a gap formation unit as extend in the document conveyance direction are formed on the conveyance path side (upper parts) of the abutment member 60 and at both the end parts of the white reference tape 64 in the direction orthogonal to the document conveyance direction. The ribs 65 are formed of a resin integrally with the abutment member 60, and the height of each rib 65 is appropriately set within a range of 0.1-1.0 mm in consideration of the thickness of the document being conveyed. Incidentally, the height of each rib 65 should preferably be slightly greater than the thickness of each of documents which are frequently used.

In addition, the guide member 552 urged by the torsion spring 553 comes into touch with the ribs 65, so that a gap of 0.1-1.0 mm corresponding to the height of each rib 65 is defined between the guide member 552 and the document conveyance surface 60a of the abutment member 60 in a state before the document is conveyed.

Besides, a white reference plate 66 being a reference member as is mounted in close touch with the first platen glass plate 72A is disposed on the underside of the abutment member 60 and on the upper side of this first platen glass plate 72A. Here, since the CIS 50 adopts the SELFOC lens 53 as the optical focusing lens, the depth of focus (depth of field) is as small as ±0.3 mm or so, and it is about 1/13 or less as compared with a depth in the case of employing the scanner device 70. In the reading by the CIS 50, the reading position of the document needs to be confined within a predetermined narrow range.

In this embodiment, therefore, the control member 55 is disposed, and the document is conveyed in the state where it is pushed against the abutment member 60 by the control member 55, whereby the attitude of the document lying between the platen roll 19 and the out rolls 20 can be stably controlled.

An arrow of dot-and-dash line indicated in FIG. 2 shows the movement of the document in the case where the control member 55 is disposed. It is understood that the document to be conveyed is conveyed while being pushed against the abutment member 60. That is, the document being conveyed is read in the state where it is pushed against the abutment member 60 by the control member 55, thereby to better inferior focusing in the case of employing the CIS 50 of the small depth of field.

Next, the processing device 200 shown in FIG. 1 will be explained.

Figure 3:
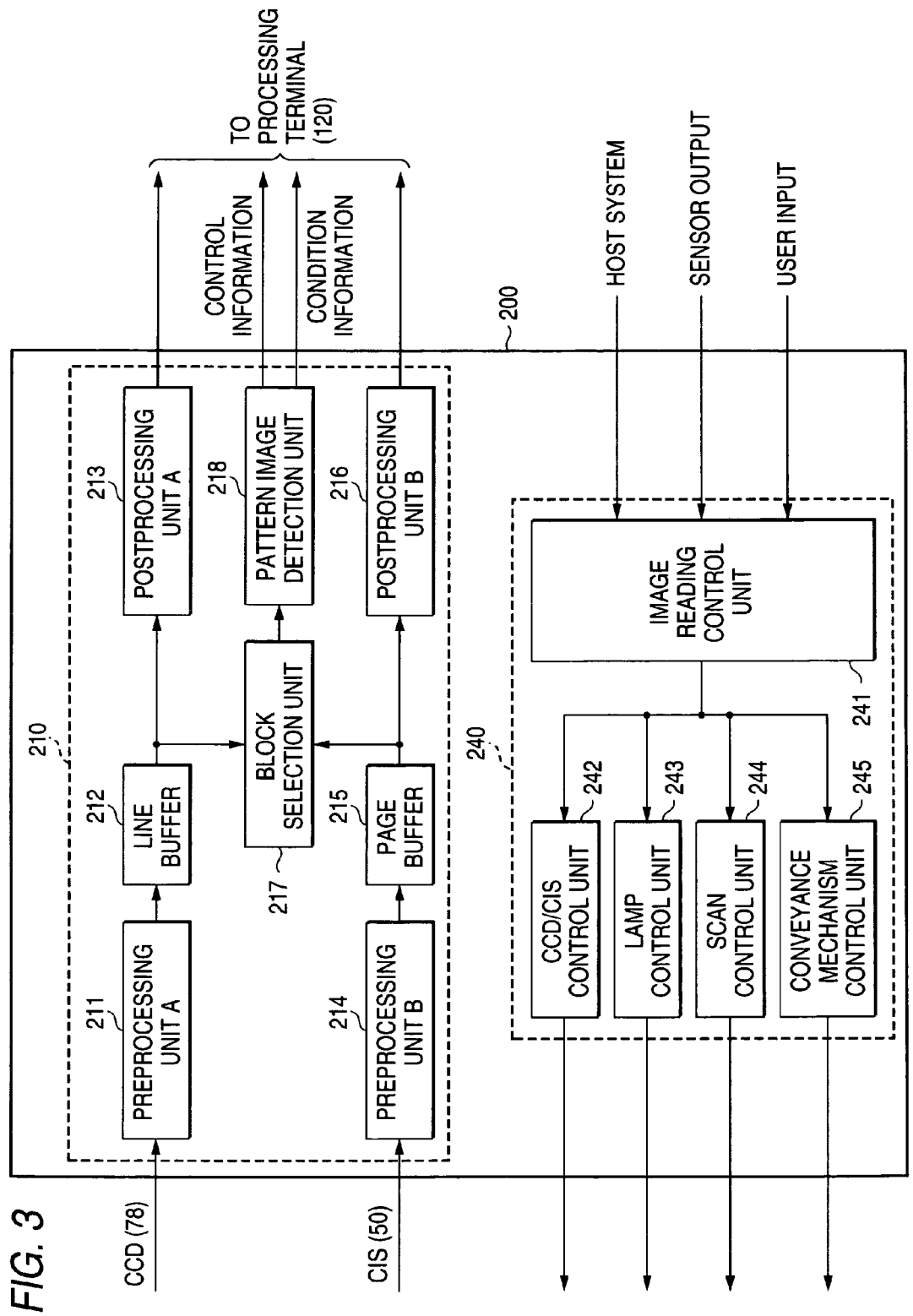
FIG. 3 is a block diagram for explaining a processing device.

FIG. 3 is a block diagram for explaining the processing device 200. The ensuing description will indicate an operation, etc. in a mode in which the image data of the first surface from the CCD image sensor 78 and the image data of the second surface from the CIS 50 are substantially simultaneously outputted toward the processing terminal 120. Mentioned as the processing terminal 120 is, for example, a personal computer (PC), a host system, or an IOT (Image Output Terminal) such as a printer being a copying unit. By the way, in a case where the processing terminal 120 is of the copying unit, the image processing system in this embodiment constructs a copying apparatus.

When broadly divided, the processing device 200 to which this embodiment is applied includes an image processing section 210 which performs predetermined image processing for image data obtained from the sensors (CCD image sensor 78 and CIS 50), and a control section 240 which controls the document feed device 10 (refer to FIG. 1) and the scanner device 70 (refer to FIG. 1).

The image processing section 210 is provided with two loops of preprocessing circuits which subject inputted digital signals to various processes such as shading corrections and gradation conversions (preprocessing unit A (211) and preprocessing unit B (214)). The preprocessing unit A (211) performs image processing for the image data of the first surface read by the CCD image sensor 78. On the other hand, the preprocessing unit B (214) performs image processing for the image data of the second surface read by the CIS 50.

In this embodiment, the document is read in the state where the full-rate carriage 73 and the half-rate carriage 75 stop at the positions of solid lines as shown in FIG. 1. Accordingly, the reading by the CIS 50 proceeds later than the reading by the CCD image sensor 78.

A line buffer 212 being a hold unit for temporarily holding the image data, temporarily holds the image data of the first surface as are outputted from the preprocessing unit A (211) and delays the image data so as to lie at the same position as that of the image data of the second surface. After having delayed the image data, the line buffer 212 outputs the image data to a postprocessing unit A (213) and a block selection unit 217. The postprocessing unit A (213) performs a scale-up/down process, a texture removal process, a binarization process, etc. for the image data inputted from the line buffer 212, and it outputs the resulting data to the processing terminal 120.

On the other hand, a page buffer 215 does not buffer (it bypasses) the image data of the second surface as are outputted from the preprocessing unit B (214), and it outputs the image data to a postprocessing unit B (216) and the block selection unit 217. The postprocessing unit B (216) performs a scale-up/down process, a texture removal process, a binarization process, etc. likewise to those of the image data of the first surface, and it outputs the processed image data to the processing terminal 120.

The block selection unit 217 selects the image data of the first surf ace and second surf ace every predetermined block, and it outputs the selected image data to a pattern image detection unit 218 being a detection unit. The pattern image detection unit 218 detects a specified pattern image from the image data selected by the block selection unit 217. In a case where the specified pattern has been detected, the pattern image detection unit 218 sends control information, etc. to the processing terminal 120 on the basis of the detected result of the specified pattern, and the processing terminal 120 performs any of various controls on the basis of the information.

In a case, for example, where the processing terminal 120 is the IOT such as printer, and where copy prohibition information which suspends or prohibits copying is contained in the control information, the copying from the IOT can be suspended or prohibited.

Besides, in a case, for example, where the processing terminal 120 is the personal computer (PC), the host system or the like which has a storage unit for storing the image data of the first surface and second surface therein, and where information to the effect of erasing the image data stored in the storage unit is contained in the control information, the stored image data can be erased on the basis of the control information.

On the other hand, the control section 240 includes an image reading control unit 241 which controls the entireties of the document feed device 10 and scanner device 70, including the various controls of duplex reading and simplex reading, and a CCD/CIS control unit 242 which controls the CCD image sensor 78 and the CIS 50. Besides, the control section 240 includes a lamp control unit 243 being a light quantity changeover unit, which controls the LEDs 52 (refer to FIG. 2) of the CIS 50 and the illuminating lamp 74 (refer to FIG. 1) of the full-rate carriage 73 in synchronism with read timings. Further, the control section 240 includes a scan control unit 244 which turns ON/OFF motors in the scanner device 70 so as to control the scan operations of the full-rate carriage 73 and half-rate carriage 75. Also, the control section 240 includes a conveyance mechanism control unit 245 which controls the operations of motors in the document feed device 10, the operations of the various rolls and feed clutch, the changeover operations of the gates, and so forth.

Control signals are outputted from the respective control units to the document feed device 10 (refer to FIG. 1) and the scanner device 70 (refer to FIG. 1), so as to permit the operation controls on the basis of such control signals. The image reading control unit 241 sets a reading mode on the basis of a control signal from the host system, a sensor output which is detected in case of, for example, an automatic selection reading function, a selection from a user, or the like, so as to control the document feed device 10 and the scanner device 70. Considered as such a reading mode is document flow reading such as a duplex simultaneous reading mode which is based on one path (without inversion), an inverting duplex reading mode which employs an inversion path, or a simplex reading mode which is based on one path, or document fixation reading in which the document placed on the first platen glass plate 72A is read.

Incidentally, there will be explained the operation of the image processing section 210 in a mode in which the image data of the first surface from the CCD image sensor 78 and the image data of the second surface from the CIS 50 are alternately outputted to the processing terminal 120, and so forth. The image data of the first surface as are outputted from the CCD image sensor 78 are inputted to the postprocessing unit A (213) and the block selection unit 217 without being buffered in the line buffer 212 (by being bypassed). On the other hand, the image data outputted from the CIS 50 are stored in the page buffer 215. The image data stored in the page buffer 215 are outputted to the block selection unit 217 and the postprocessing unit B (216) after the image data of the first surface have been outputted to the block selection unit 217. The block selection unit 217 selects every surface without segmenting the image data of the first surface and second surface in block units, and outputs the image data to the pattern image detection unit 218.

Next, the selection of the image data by the block selection unit 217 will be explained.

FIGS. 4A to 4C are explanatory diagrams showing the aspect of the selection of the image data by the block selection unit 217. FIG. 4A shows the image data of the first surface as are inputted to the block selection unit 217. On the other hand, FIG. 4B shows the image data of the second surface as are inputted to the block selection unit 217. Further, FIG. 4C shows the image data which are generated in the block selection unit 217 and which are outputted from this block selection unit 217.

As stated above, the image data of the first surface are delayed by the line buffer 212 (refer to FIG. 3), so that the respective image data of the first surface and second surface arrive at the block selection unit 217 substantially simultaneously. The block selection unit 217 selects one of the surfaces and segments the image data inputted to this block selection unit 217 since the time of the selection, by blocks corresponding to the predetermined number of lines, whereupon it outputs the segmented image data. Incidentally, the segmentation is not done in the main scan direction, and it is done only in the subscan direction. In this embodiment, the block selection unit 217 first selects the image data of the first surface. Here, the image data of the first surface toward the image data 1-E thereof as are headed by the image data 1-A thereof are inputted to the block selection unit 217. The block selection unit 217 segments the image data of the first surface as have been initially inputted and outputs the segmented data (1-A).

After having outputted the image data 1-A of the first surface, the block selection unit 217 changes-over the selection from the first surface to the second surface. Subsequently, the block selection unit 217 segments the image data of the second surface as are inputted to this block selection unit 217 after the changeover, by the blocks corresponding to the predetermined number of lines, and it outputs the segmented image data (2-B). The image data 2-B is arranged next the image data 1-A of the first surface as has already been arranged. Besides, the block selection unit 217 alternately repeats the selections of the first surface and second surface up to the rear end of the document, and it outputs the image data corresponding to the predetermined number of lines as are inputted during the selections. As a result, the image data (FIG. 4C), in which the first surface and second surface segmented in the subscan direction are alternately combined and which have a size equal to that of the document, are generated and are outputted to the pattern image detection unit 218 (refer to FIG. 3). Incidentally, the number of lines in correspondence with which each surface is segmented in the subscan direction needs to be larger than the size of the block into which a code array is blocked and segmented by a blocking process portion 222 (refer to FIG. 5) included in the pattern image detection unit 218.

By the way, in this embodiment, the sizes of the blocks which are selected from the first surface and second surface are substantially the same, but they need not always be the same sizes. The sizes of the blocks can also be made nonuniform.

Further, in this embodiment, the image data of the first surface and second surface are alternately outputted. By way of example, however, it is also possible that, after the image data of the first surface have been outputted, the first surface is selected again so as to successively output the image data of this first surface. That is, the first surface and the second surface can be selected at random unlike the alternate selections.

Besides, the block units of the image data for the segmentation need not always be the predetermined size previously set, but a time segmentation in which the size of the block of the image data is determined with reference to time can also be performed. It is also possible, for example, to previously set the time periods of the selections by the block selection unit 217 as correspond to the first surface and second surface, respectively, to segment the image data simultaneously with the ends of the selection time periods, and to output the segmented image data.

The above is the configuration in which the image data of the second surface as are stored in the storage device are not detected after the detection of all the image data of the first surface, but the image data of the first surface and those of the second surface are appropriately selected so as to detect the specified pattern of the copy prohibition information or the like from the selected image data. As a result, the image data containing the copy prohibition information or the like need not be stored in the storage device, and hence, a reliability on security can be enhanced. Further, in a case where the copy prohibition information or the like has been found on the side of the second surface, this copy prohibition information or the like existing on the second surface can be early detected without waiting for the end of the detection of all the image data of the first surface. Moreover, as soon as the copy prohibition information or the like has been detected, it can be performed to inhibit the reading of the document, to suspend or inhibit the copying, or to erase image data information stored in the personal computer (PC) or the like. That is, later processing which is performed on the basis of the detection of the copy prohibition information or the like can also be carried out early.

Further, with a configuration in which the image data of the second surface as are stored in the storage device are detected after the detection of all the image data of the first surface, the image data of both the first surface and second surface cannot be simultaneously outputted toward the processing terminal 120. This poses the problem that a long time is required since the reading of the document till a process (for example, copying, storage or retention) by the processing terminal 120.

In this embodiment, both the image data from the CCD image sensor 78 and the CIS 50 are inputted to the block selection unit 217, while they are sequentially outputted toward the processing terminal 120. In the processing terminal 120, therefore, the image data of both the surfaces can be processed.

In a case, for example, where it has been revealed that the copy prohibition information or the like is not detected, the processing of both the image data of the first surface and the second surface as are stored in the processing terminal 120 can also be immediately started. Further, the processing of both the image data of the first surface and second surface can also be performed in the processing terminal 120, in parallel with the detection of the copy prohibition information or the like in the pattern image detection unit 218.

Besides, since the processing device 200 includes the single pattern image detection unit 218, the consumption power and cost thereof can be suppressed. Further, the size of the body of a copying machine or the like can be moderated. Moreover, the copy prohibition information or the like can be detected simultaneously from the front and back images of the document by the single pattern image detection unit 218.

Further, in this embodiment, the segmentation of the image data is performed only in the subscan direction, and hence, it can be easily performed. By the way, in a case where the specified pattern of the copy prohibition information or the like has been detected on either the first surface or the second surface, the selection of the surface on which the specified pattern of the copy prohibition information or the like has been detected can also be ended so as to change-over the selection to the other surface. In this way, the image data of the other surface can be concentratively inputted to the pattern image detection unit 218, and whether or not the specified pattern is also existent on the other surface can be promptly detected.

Next, the pattern image detection unit 218 will be explained.

Figure 5:
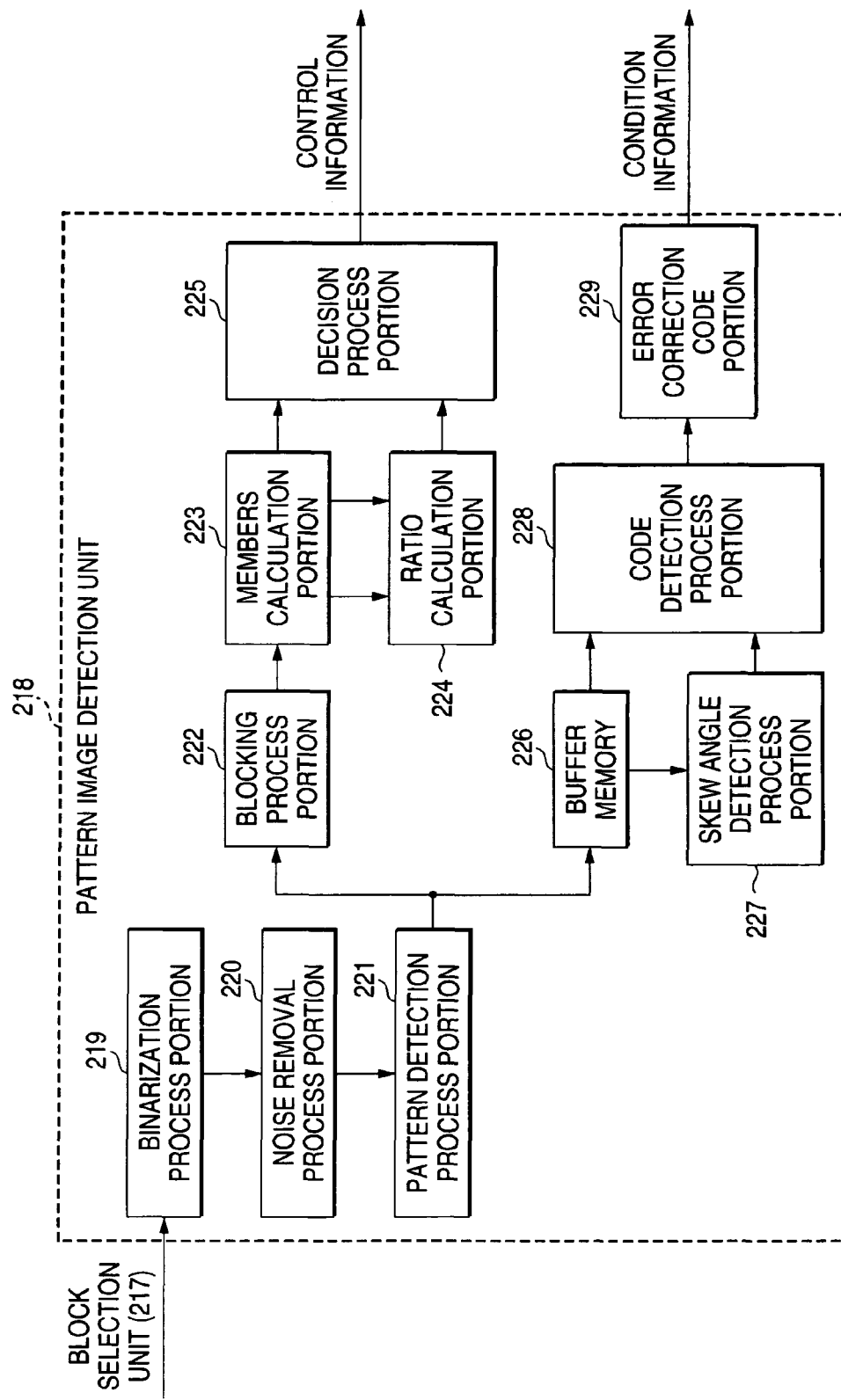
FIG. 5 is a block diagram for explaining a pattern image detection unit.

FIG. 5 is a block diagram for explaining the pattern image detection unit 218. The pattern image detection unit 218 includes a binarization process portion 219, a noise removal process portion 220 and a pattern detection process portion 221. Besides, the pattern image detection unit 218 includes the blocking process portion 222, a numbers calculation portion 223, a ratio calculation portion 224 and a decision process portion 225. Further, the pattern image detection unit 218 includes a buffer memory 226, a skew angle detection process portion 227, a code detection process portion 228 and an error correction code portion 229.

The binarization process portion 219 converts image data inputted from the block selection unit 217, into the binarized data of "0" or "1", and the resulting data are inputted to the noise removal process portion 220.

The noise removal process portion 220 removes a noise component contained in the binarized data, and it inputs the noise-removed binarized data to the pattern detection process portion 221.

Here, the removal of the noise component signifies that any pixel bulk in which black pixels are coupled is found, and that the respective pixels of the pixel bulk whose size (number of coupled pixels) does not lie within a predetermined range are replaced with white pixels. The predetermined range is set so that the above two-dimensional code may not be deleted, and that any other pattern (an isolated dot pattern, a character or figure in a document, or the like) may be deleted.

The pattern detection process portion 221 executes a pattern detection process which detects the specified pattern image serving as a reference pattern, and it inputs 1-pixel 2-bit image data which is the result of the detection process, to the blocking process portion 222 and the buffer memory 226.

Such specified pattern images of two sorts exist in this embodiment.

Figure 6A:
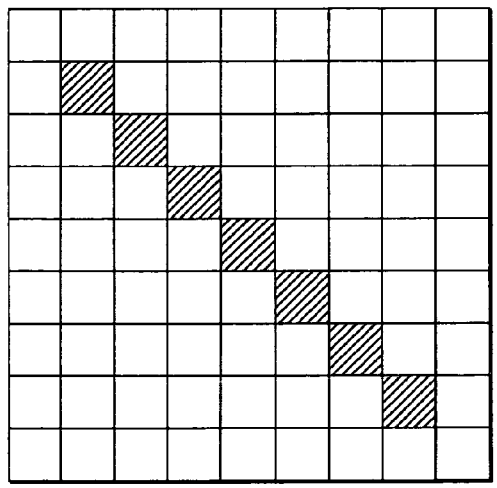
FIGS. 6A and 6B are explanatory diagrams showing specified pattern images.
Figure 6B:
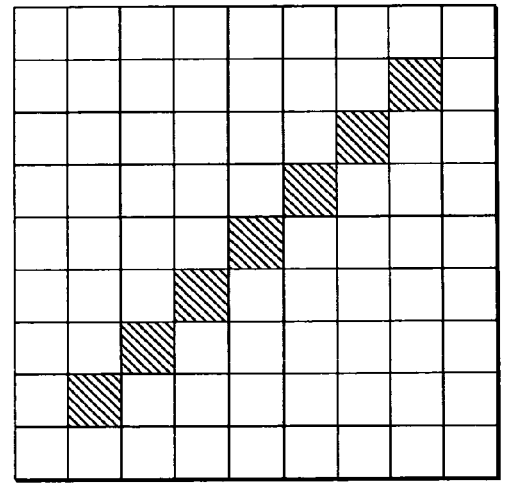

FIGS. 6A and 6B is an explanatory diagram showing the specified pattern images. FIG. 6A shows the specified pattern image (A), which is formed as a backslash "\" falling rightwards. FIG. 6B shows the specified pattern image (B), which is formed as a slash "/" rising rightwards.

The pattern images are successively applied at the positions of the respective pixels in the image represented by the binarized data, and the specified pattern image is detected by template matching. By way of example, the data "0" is outputted in a case where the specified pattern image (A) has been detected, the data "1" is outputted in a case where the specified pattern image (B) has been detected, and data "2" is outputted in a case where neither of the pattern images has been detected. That is, the pixel data is outputted as a code array. Incidentally, a pattern sensing method which utilizes the template matching is a known technique, and it shall therefore be omitted from more detailed description.

The blocking process portion 222 blocks and segments into a predetermined size, the code array which is represented by "0", "1" and "2" and which is the sensed result of the pattern detection process portion 221, and it inputs an obtained result to the numbers calculation portion 223.

The numbers calculation portion 223 calculates the numbers of the array data "0" and "1" which exist within the block set by the blocking process portion 222, respectively, and it inputs calculated results to the ratio calculation portion 224 and the decision process portion 225.

The ratio calculation portion 224 calculates a ratio from the numbers of the array data "0" and "1", and it inputs the calculated value to the decision process portion 225. The decision process portion 225 decides the attribute of the block on the basis of the numbers of the array data "0" and "1" as have been inputted from the numbers calculation portion 223, and the ratio inputted from the ratio calculation portion 224, and it outputs the control information to the processing terminal 120.

By way of example, the decision process portion 225 decides whether or not the array data of the pertinent block are "0"s at or above a predetermined ratio or all "1"s. Subject to the decision that the array data are "0"s at or above the predetermined ratio or all "1"s, the copy prohibition information or the information to the effect of erasing the image data stored in the storage device, for example, is outputted to the processing terminal 120 as the control information. By way of example, when the copy inhibition information is inputted, the processing terminal 120 performs the operation of suspending or prohibiting copying. Besides, the image data stored in the storage unit are erased on the basis of the control information to the effect of erasing the image data. As a result, by way of example, a paper the copying of which is to be prohibited can be prohibited from being copied. Further, the reading of the document in the duplex simultaneous reading apparatus 110 (refer to FIG. 1) can be suspended on the basis of the copy prohibition information.

On the other hand, the skew angle detection process portion 227 reads out the code array stored in the buffer memory 226, it obtains the skew angle of the input image data, and it inputs the obtained skew angle to the code detection process portion 228. This skew angle detection process portion 227 obtains the skew angle in such a way, for example, that pixels consisting only of the code data (pixel value) "0" or "1" are subjected to a Hough transformation, and that the peak of the projection distribution of the pixels on an angle axis is obtained.

The code detection process portion 228 reads out the code array stored in the buffer memory 226, and it detects a condition code from a condition code array part by referring to the skew angle sensed by the skew angle detection process portion 227.

By way of example, the code detection process portion 228 scans the image along the skew angle obtained by the skew angle detection process portion 227, so as to derive data of "0" or "1" (corresponding to the code data "0" or "1"). A synchronous code is found out from the train of the derived data. The synchronous code is defined as, for example, a code in which the outer periphery of a rectangular region of predetermined height and width is entirely formed of "1". A bit array which is enclosed with the synchronous code is the condition code.

The code detection process portion 228 rearranges the bit array of the condition code into a unidimensional data train (bit train), and it outputs the data train to the error correction code portion 229. The error correction code portion 229 executes a predetermined error correction decoding process for the bit train inputted from the code detection process portion 228, so as to decode condition information on the basis of the array order of the pattern images, and it outputs the decoded condition information.

The condition information is sent to the processing terminal 120 likewise to the control information. Here, the "condition information" is information which indicates a condition for making possible the restart or start of copying, the restart of suspended document reading, the suspension of the erasing of image data, or the like, and which is formed of, for example, a cipher number, a user ID number (for example, employee number) permitting copying, and a date and hour permitting the copying.

By way of example, in the case where the processing terminal 120 is the IOT, the copying of the document by the IOT is suspended or prohibited when the copy prohibition information is contained in the control information. However, a user who is allowed to copy may perform the copying, and it is sometimes inappropriate to prohibit all copying operations.

In this embodiment, therefore, specified users are permitted to copy, by employing the condition information. Information inputted from a user and the condition information are compared for judgment, and when both the information items have coincided, the copying is restarted or started. Thus, unspecified users can be prohibited from copying, whereas the specified users can be permitted to copy.

Besides, in the case where the information to the effect of erasing the image data stored in the storage unit is contained in the control information, the processing terminal 120 can be configured so as to erase the image data stored in the personal computer (PC) or host system, as stated before. In this case, the erasing of the image data can also be suspended under the condition that the condition information and information inputted from a user have coincided.

Besides, the condition code can store therein position information which differs depending upon a location where each condition code is arranged. Which of the first surface and the second surface the copy prohibition information or the information to the effect of erasing the stored image data is existent on, can be identified by acquiring the position information. Thus, a control is also possible which permits a user to copy only the document surface where the copy prohibition information has not been detected. It is also possible to erase the image data of only the surface where the information to the effect of erasing the stored image data has been detected.

By the way, in this embodiment, such synchronous codes and condition codes are provided extensively on the whole surface of the document. The "whole surface", however, does not signify that all of the four corners of the document are included. The reason therefor is that, in an apparatus of electrophotographic scheme or the like, the peripheral edge of a paper sheet is often an unprintable extent. In the case where the specified patterns are extensively arranged, the specified pattern may possibly be contained in the image data blocked and segmented by the block selection unit 217. As a result, the specified pattern can be detected early, and the process of the copy prohibition or the like in the processing terminal 120 can be performed early.

Here, parts of the above contents will be explained with reference to a flow chart.

Figure 7:
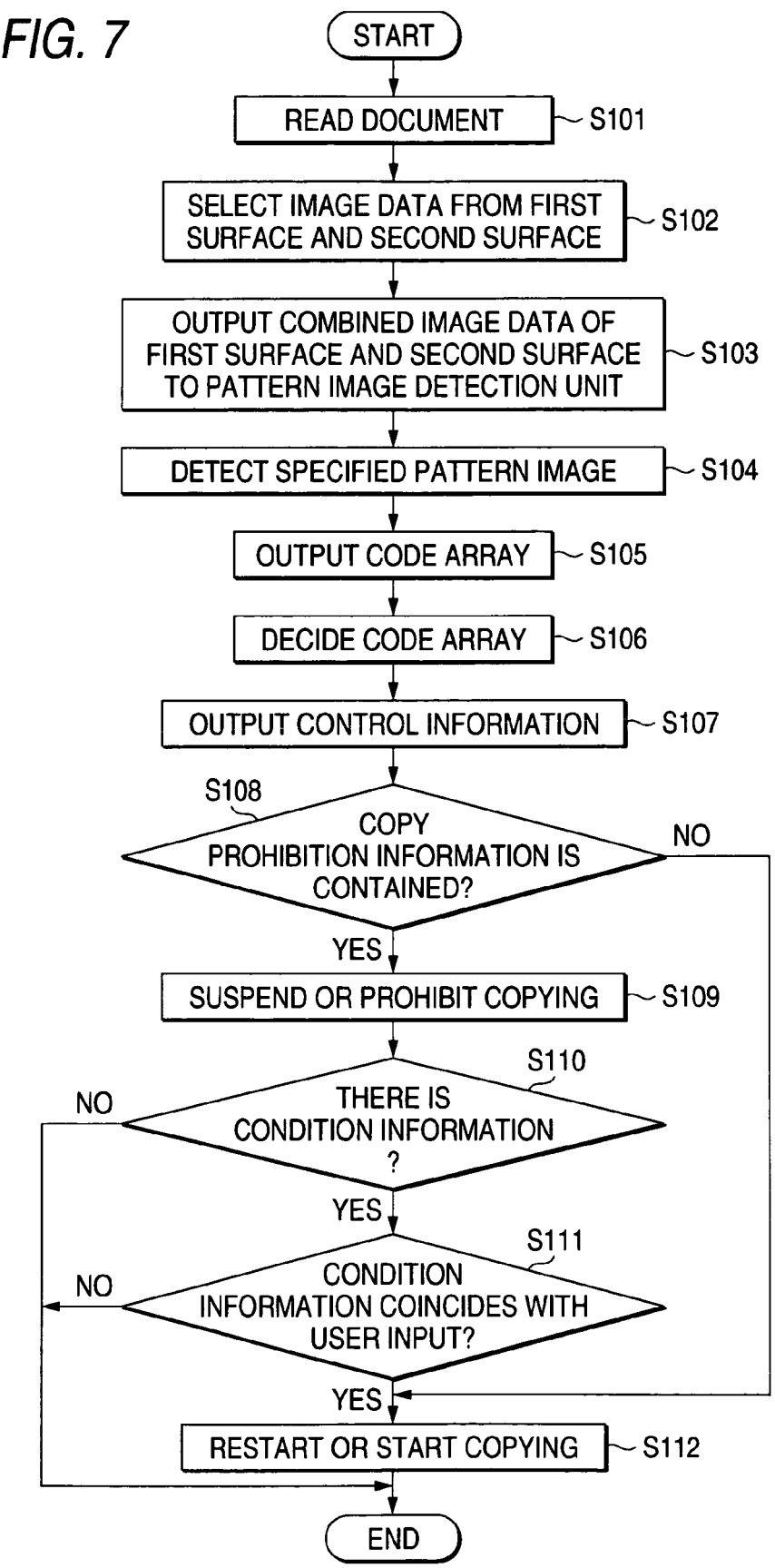
FIG. 7 is a flow chart showing a flow from the reading of a document to the copying thereof.

FIG. 7 is a flow chart showing a flow from the reading of a document to the copying thereof.

First, the document is read by the duplex simultaneous reading apparatus 110 (refer to FIG. 1) (step 101). The block selection unit 217 (refer to FIG. 3) selects image data from the image data of a first surface and a second surface having been read (step 102). This block selection unit 217 combines the image data of the first surface and second surface, and outputs the combined image data to the pattern image detection unit 218 (refer to FIG. 3) (step 103). Besides, the pattern image detection unit 218 detects any specified pattern image from the combined image data (step 104). Subsequently, the pattern image detection unit 218 (the pattern detection process portion 221 (refer to FIG. 5)) executes a pattern detection process for detecting the specified pattern image, and it outputs 1-pixel 2-bit image data as a code array (step 105).

Besides, the pattern image detection unit 218 (the decision process portion 225 (refer to FIG. 5)) decides the outputted code array (step 106), and it outputs control information on the basis of the result of the decision (step 107). In a case where the control information contains copy prohibition information for prohibiting the copying of the document (step 108), the copying is suspended or prohibited (step 109). In contrast, in a case where the control information does not contain the copy prohibition information, the copying is started (step 112). In the case where the suspension or the like of the copying is made at the step 109, whether or not condition information exists is subsequently judged (step 110). Besides, in a case where the condition information exists, whether or not the condition information coincides with information inputted from a user is judged (step 111). Subsequently, in a case where the condition information and the user input coincide, the copying is restarted or started (step 112).

On the other hand, in a case where the condition information does not exist at the step 110, or in a case where the condition information and the user input do not coincide (they disagree) at the step 111, the routine is ended without performing the restart or the like of the copying. Incidentally, although the prohibition or the like of the copying has been explained in the flow chart, the operation of suspending the reading of the document by the duplex simultaneous reading apparatus 110 can also be performed at the step 109. Besides, in a case where information to the effect of erasing image data stored in the storage unit for storing the image data of the first surface and second surface is contained in the control information outputted at the step 107, the erasing of the image data can also be performed at the step 109. Further, when the condition information and the information inputted from the user coincide, the erasing of the image data can also be suspended at the step 112.

Second Embodiment

Another aspect in block selection will be described as a second embodiment.

FIGS. 8A to 8C are explanatory diagrams for explaining the other aspect in the block selection. FIG. 8A shows the image data of a first surface as are inputted to a block selection unit 217. On the other hand, FIG. 8B shows the image data of a second surface as are inputted to the block selection unit 217. Further, FIG. 8C shows image data which are generated in the block selection unit 217 and which are outputted from this block selection unit 217.

The first embodiment described above has been in the aspect where each surface is segmented in correspondence with the predetermined number of lines in only the subscan direction. Therefore, the pattern image in the image data of the second surface cannot be detected before the end of the detection of the specified pattern for the predetermined number of lines from the head of the first surface of the document.

The second embodiment here is configured so as to segment the image data also in the main scan direction, and to alternately arrange the images of the first surface and second surface also in the main scan direction. In more detail, the block selection unit 217 selects the first surface, it blocks and segments the image data in correspondence with the predetermined number of lines in the subscan direction and in a predetermined size also in the main scan direction (1-A-1), and it outputs the image data 1-A-1 to a position corresponding to the arrangement position thereof in the first surface.

After having outputted the image data 1-A-1, the block selection unit 217 changes-over its selection from the first surface to the second surface. Besides, the block selection unit 217 blocks and segments the image data of the second surface in correspondence with the predetermined number of lines in the subscan direction and in the predetermined size also in the main scan direction (2-A-2). Subsequently, the block selection unit 217 outputs the image data 2-A-2 to a position which is adjacent to the already arranged image data 1-A-1 of the first surface and which corresponds to the arrangement position of this image data 2-A-2 in the second surface. Thenceforth, the block selection unit 217 alternately repeats the selections of the first surface and second surface to the tail end of the document, and it outputs the blocks of image data each corresponding to the predetermined number of lines and having a predetermined length also in the main scan direction, alternately in the main scan direction and the subscan direction. As a result, the image data (FIG. 8C), in which the image data of the first surface and second surface are alternately combined in the main scan direction and subscan direction and which have a size equal to that of the document, are generated and are outputted to the pattern image detection unit 218 (refer to FIG. 3).

Besides, in the pattern image detection unit 218, the detection of the specified pattern, etc. are thereafter performed as in the first embodiment. Incidentally, also in this case, the block size of the segmentation needs to be larger than the size of the block into which a code array is blocked and segmented by the blocking process portion 222 (refer to FIG. 5) included in the pattern image detection unit 218.

When, in this manner, the image data are segmented also in the main scan direction so as to arrange the image data of both the surfaces also in the main scan direction, the specified pattern on the second surface can be detected without waiting for the end of the predetermined number of lines.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosures of Japanese Patent Applications No. 2005-316906 filed on Oct. 31, 2005, including specification, claims, drawings and abstract are incorporated herein by reference in its entirety.

What is claimed is:

1. A duplex simultaneous reading apparatus having an image reading unit for simultaneously reading a first surface and a second surface of a document, the duplex simultaneous reading apparatus comprising:

a detection unit for detecting any specified pattern image from image data read by the image reading unit; and a selection unit for selectively inputting the read image data of the first surface of the document and the read image data of the second surface to the detection unit in block units, wherein the detection unit detects the specified pattern image in the first surface or the second surface of the document, from the block-unit image data inputted by the selection unit, and the selection unit selects the image data alternately from the first surface and the second surface.

2. The duplex simultaneous reading apparatus according to claim 1, wherein the block is a unit in which the image data are not segmented in a main scan direction, and in which they are segmented in correspondence with a predetermined number of lines in only a sub scan direction.

3. The duplex simultaneous reading apparatus according to claim 1, wherein the block is a unit in which the image data are segmented in correspondence with a predetermined number of lines in a subscan direction, and in which they are segmented also in a main scan direction.

4. The duplex simultaneous reading apparatus according to claim 1, wherein the block is segmented with reference to time.

5. A duplex simultaneous reading apparatus having an image reading unit for simultaneously reading a first surface and a second surface of a document, the duplex simultaneous reading apparatus comprising:

a detection unit for detecting any specified pattern image from image data read by the image reading unit; and a selection unit for selectively inputting the read image data of the first surface of the document and the read image data of the second surface to the detection unit in block units, wherein the detection unit detects the specified pattern image in the first surface or the second surface of the document, from the block-unit image data inputted by the selection unit, and when the specified pattern image has been detected from the first surface of the document, the selection unit ends the selection of the first surface and changes-over its selection to the second surface, whereupon the selection unit inputs the image data of the second surface to the detection unit.

6. The duplex simultaneous reading apparatus according to claim 1, wherein the image reading unit suspends the reading of the document on the basis of a result of the detection of the specified pattern image by the detection unit.

7. A copying apparatus comprising:

an image reading unit for simultaneously reading a first surface and a second surface of a document;

a copy unit for copying image data of the first surface and the second surface read by the image reading unit;

a selection unit for selecting image data from the read image data of the first surface of the document and the read image data of the second surface in block units; and a detection unit for detecting any specified pattern image from the image data selected by the selection unit, and for outputting control information on the basis of a result of the detection, wherein the copy unit suspends or prohibits the copying on the basis of the control information, and the selection unit selects the image data alternately from the first surface and the second surface.

8. The copying apparatus according to claim 7, wherein:

the detection unit outputs condition information on the basis of the detected result of the specified pattern image; and the copy unit restarts or starts the copying in a case where the condition information and information inputted from a user have coincided.

9. A method for processing an image comprising:

simultaneously reading a first surface and a second surface of a document;

selecting image data from image data of the first surface and the second surface having been read;

detecting any specified pattern image from the selected image data;

outputting control information for suspending or prohibiting copying of the document, on the basis of a result of the detection; and suspending or prohibiting the copying of the document on the basis of the control information, wherein the selecting image data comprises selecting the image data alternately from the first surface and the second surface.

* * * * *